United States Patent
Nair et al.

(10) Patent No.: US 10,877,869 B1
(45) Date of Patent: Dec. 29, 2020

(54) METHOD AND SYSTEM FOR IMPLEMENTING A CODE REVIEW TOOL

(71) Applicant: JPMorgan Chase Bank, N.A., New York, NY (US)

(72) Inventors: Rakesh Balachandran Nair, Bangalore (IN); Gowthamen Natarajan, Bengaluru (IN); Dinesh Babu Parthasarathi, Bournemouth (GB); Narayana N. Venkata, Bangalore (IN); Nicholas M. Lore, Pearl River, NY (US)

(73) Assignee: JPMorgan Chase Bank, N.A., New York, NY (US)

(*) Notice: Subject to any disclaimer, the term of this patent is extended or adjusted under 35 U.S.C. 154(b) by 65 days.

(21) Appl. No.: 15/446,350

(22) Filed: Mar. 1, 2017

Related U.S. Application Data (60) Provisional application No. 62/383,830, filed on Sep. 6, 2016.

(51) Int. Cl.
| | |
|---|---|
| G06F 9/44 | (2018.01) |
| G06F 11/36 | (2006.01) |
| G06F 8/41 | (2018.01) |
| G06Q 10/06 | (2012.01) |
| G06Q 40/02 | (2012.01) |

(52) U.S. Cl.
CPC ............ *G06F 11/3608* (2013.01); *G06F 8/41* (2013.01); *G06Q 10/06* (2013.01); *G06Q 40/02* (2013.01)

(58) Field of Classification Search
CPC ........ G06F 8/41; G06G 11/3608; G06Q 40/02
See application file for complete search history.

(56) References Cited

U.S. PATENT DOCUMENTS

| | | | | |
|---|---|---|---|---|
| 6,256,773 | B1 * | 7/2001 | Bowman-Amuah | G06F 8/71 |
| | | | | 707/999.202 |
| 6,775,827 | B1 * | 8/2004 | Harkins | G06F 11/3624 |
| | | | | 714/E11.209 |
| 7,904,802 | B1 * | 3/2011 | Kolawa | G06Q 10/103 |
| | | | | 705/300 |
| 8,856,725 | B1 * | 10/2014 | Anderson | G06F 8/75 |
| | | | | 717/103 |
| 10,180,836 | B1 * | 1/2019 | Arguelles | G06F 8/33 |
| 2007/0168959 | A1 * | 7/2007 | Bayari | G06Q 10/10 |
| | | | | 717/120 |

(Continued)

OTHER PUBLICATIONS jBC Programmer Reference Guide, Jan. 9, 2013 (Year: 2013).*

*Primary Examiner* — Lewis A Bullock, Jr.
*Assistant Examiner* — Tina Huynh
(74) *Attorney, Agent, or Firm* — Hunton Andrews Kurth LLP (57) ABSTRACT

An embodiment of the present invention is directed to a code review tool. A system that implements a T24 code review tool comprises: a memory component; an interactive interface that receives one or more user inputs; a processor, coupled to the memory component and the interactive interface, the processor configured to perform the steps comprising: retrieve components of an application; initiate automated code review function for the components; identify code review comments prior to code compilation; display comments with severity for code review; and confirm and initiate code compilation process.

18 Claims, 7 Drawing Sheets

(56) References Cited

U.S. PATENT DOCUMENTS

| | | | | |
|---|---|---|---|---|
| 2008/0295085 | A1* | 11/2008 | Rachamadugu | G06F 8/75 717/159 |
| 2009/0249299 | A1* | 10/2009 | Farchi | G06F 11/3676 717/125 |
| 2010/0242028 | A1* | 9/2010 | Weigert | G06F 21/105 717/131 |
| 2014/0196010 | A1* | 7/2014 | Balachandran | G06F 8/71 717/124 |
| 2015/0154098 | A1* | 6/2015 | Balasubramanian | G06F 11/3604 717/126 |
| 2015/0205600 | A1* | 7/2015 | Grillo | G06F 16/148 717/101 |
| 2016/0004517 | A1* | 1/2016 | Safary | G06F 8/436 717/131 |

* cited by examiner

METHOD AND SYSTEM FOR IMPLEMENTING A CODE REVIEW TOOL

CROSS REFERENCE TO RELATED APPLICATIONS

The application claims priority to U.S. Provisional Application 62/383,830, filed Sep. 6, 2016, the contents of which are incorporated herein in its entirety.

FIELD OF THE INVENTION

The present invention generally relates to a code review tool and more specifically to an automated code review tool that provides an interactive user interface to identify and address coding issues.

BACKGROUND OF THE INVENTION

Generally, code review is a systematic examination of computer source code that identifies mistakes, inconsistencies and other issues that require correction or approval. Code review is generally a labor intensive and time consuming task. For specific applications with unique standards and requirements, the task can be even more burdensome.

Temenos T24 is a core banking system with system extensions that can be developed in jBC, a programming language that is used in jBASE database management system. T24 is an industry wide application made up of Core development tailored to a particular client's needs. The current development process involves a manual code review of Local Source code, which is labor intensive and prone to human error.

These and other drawbacks exist.

SUMMARY OF THE INVENTION

Accordingly, one aspect of the invention is to address one or more of the drawbacks set forth above. According to an embodiment of the present invention, an automated computer implemented system that implements a T24 code review tool comprises: a memory component; an interactive interface that receives one or more user inputs; a processor, coupled to the memory component and the interactive interface, the processor configured to perform the steps comprising: retrieve components of an application; initiate automated code review function for the components; identify code review comments prior to code compilation; display comments with severity for code review; and confirm and initiate a code compilation process.

According to another embodiment of the present invention, an automated computer implemented method that implements a T24 code review tool comprises the steps of: retrieving, from a memory, components of an application; initiating, via a computer processor, automated code review function for the components; identifying code review comments prior to code compilation; displaying, via an interactive interface, comments with severity for code review; and confirming and initiating a code compilation process.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Code Review Tool that automatically verifies coding standards and generates a report identifying issues to streamline responsive actions. According to an exemplary embodiment, the Code Review Tool may be specific to banking system, such as a T24 core banking system. According to this example, the Code Review Tool may analyze code based on Info Basic programming standards to be followed while coding in jBASE or TAFC. jBASE represents a Database Management System comprising development tools, middleware and a multi-dimensional (MultiValue) database. TAFC represents Temenos Application Framework for C. The Code Review Tool of an embodiment of the present invention may also highlight points to be considered against T24 development standards for Local code. Other criteria, programming standards and factors may be applied and implemented.

An embodiment of the present invention is directed to automating and enhancing best practice checks that may be performed on the code. Also, an embodiment of the present invention may be integrated with an industry wide development tool. The innovative Code Review Tool may generate a report (or other electronic output) at the end of or during the review highlighting whether the code has passed the review or not, and if not, where the areas of review or action may be required. In addition, an embodiment of the present invention is directed to building integration between a Local Code Review tool and an industry wide version control tool. The innovative tool may also incorporate functionality built into the Code Review tool that reviews existing Local Code and highlights issues that are known defects as well as issues that do not meet quality and/or other criteria. Other issues may be identified and addressed.

An embodiment of the present invention provides customization of local code to meet specific clients requirements, e.g., financial institution, business entity, etc. The innovative tool may provide a web front end that enables users to run queries, execute transactions as well as maintain cash accounts for an International region covering current accounts, savings accounts and nostros/vostros, for example. Balances may be maintained by receipt of credit/debit postings mainly via end of day batches and intraday postings. For example, a global platform may service various branches across multiple countries for regulatory reasons. Also, there may be 12000+ daily interfaces in/out of the platform that drive end of day batch (which calculate interest accruals, interest capitalization, tax, sweeps etc.) produces client reporting, SWIFT and paper statements. Overnight positions may be maintained in the hundreds of billion per day.

The Code Review Tool of an embodiment of the present invention may include a static code analyzer. The system recognizes that coding standards may evolve and may be further configured and customized. For example, the Code Review Tool may parameterize severity of coding standards. The Code Review Tool of an embodiment of the present invention simplifies access to developers. The tool may be integrated in a development tool and may automatically create tickets in JIRA, for example. JIRA represents an issue tracking product that provides bug tracking, issue tracking, and project management functions. Other products may be implemented. The Code Review Tool of an embodiment of the present invention also realizes efficiencies and conserves resources as code review is automated and simplified. In addition, users may have access to legacy code review issues. For example, the Code Review Tool may compare legacy code to new or updated code.

According to an embodiment of the present invention, the Code Review Tool may generate an output, such as a report at the end of the review (or other time during the review) highlighting whether the code has passed review or not and where the areas of review may be required or suggested. For example, the Code Review Tool provides various options, including review report generated; report copied to the remote server and report uploaded to the Jira. According to another embodiment, the Code Review Tool may report via an alert (e.g., notification, message, etc.) to code or product owners. Other recipients may be identified.

According to an embodiment of the present invention, the Code Review Tool may also send an electronic communication, e.g., email, text, notification, etc. with an option to establish a secure connection to the Code Review Tool to address errors, answer questions, provide additional input, provide supervision, etc. The option may include a link or other form of electronic communication.

The Code Review Tool of an embodiment of the present invention may display prior review comments with a lookup of code. For example, the Code Review Tool may fetch a previous version of the code from a source code management tool, such as GIT (a version control system) or other version control system that tracks changes in files.

Figure 1:
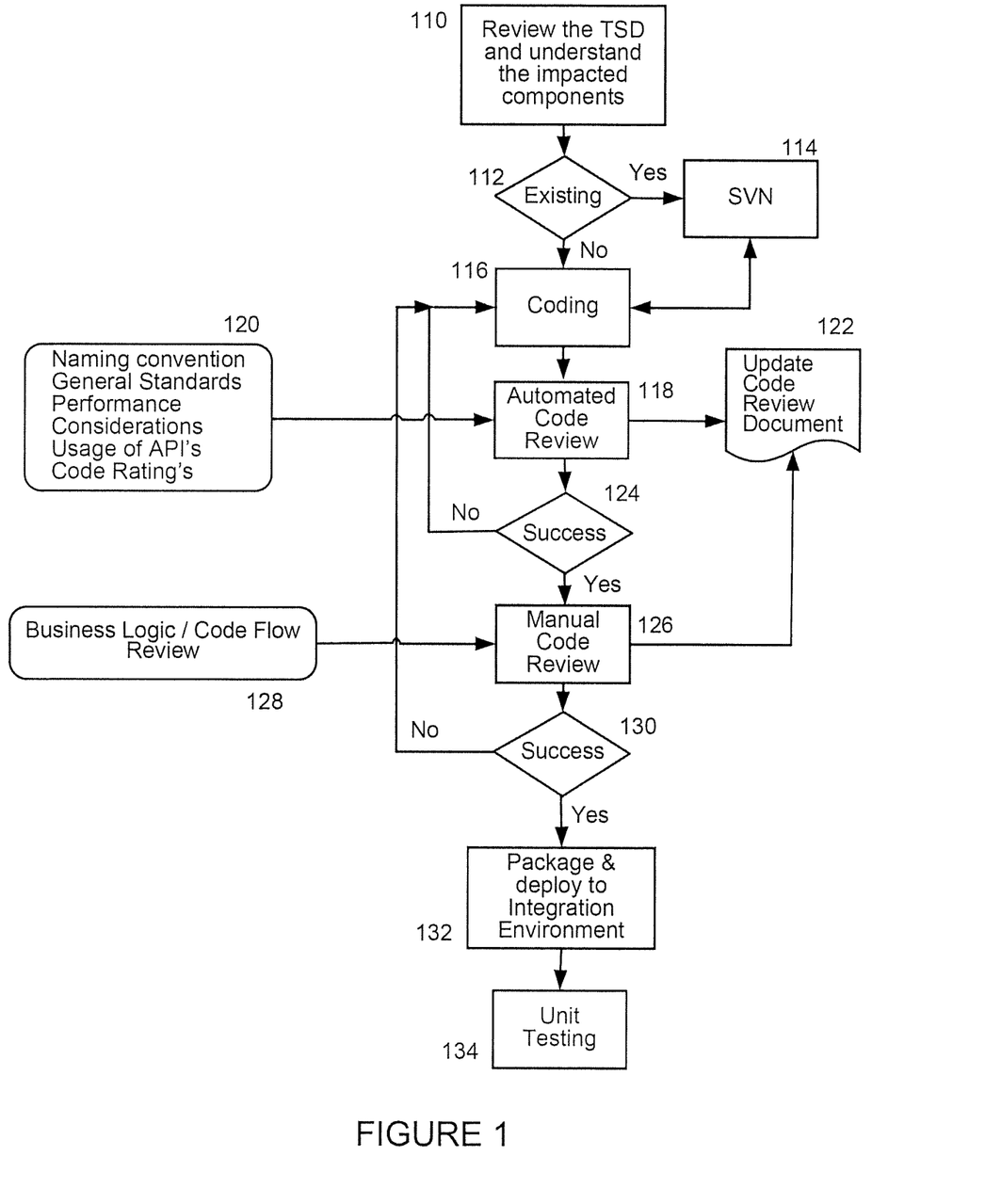
FIG. 1 is an exemplary flowchart of a method for implementing a Code Review Tool, according to an embodiment of the present invention.

FIG. 1 is an exemplary flowchart of a method for implementing a Code Review Tool, according to an embodiment of the present invention. At step 110, the system may review a technical specification document ("TSD") and identify impacted components. Also, a developer may perform the review and ascertain impacted components. At step 112, the system may determine whether components exist. If yes, the system may access SVN, at step 114. If not, the system may proceed with coding, at step 116. At step 118, an automated code review may be initiated. Automated Code Review may receive inputs regarding standards, criteria, requirements as represented by 120. Automated Code Review 118 may further update code review documentation or source, at step 122. If the code review is deemed successfully, at step 124, the process may proceed to additional code review, at step 126. If the code review is not deemed successfully, the process may proceed back to Coding, at step 116. Manual code review 126 may receive inputs, such as business logic as well as code flow review guidelines, as represented by 128. If the manual code review is deemed successful, at step 130, the system may proceed to package and deploy to an integration environment, at step 132. Otherwise, the process will proceed to back Coding, at step 116. Finally, the process may perform unit testing, at step 134. Other testing and steps may be applied. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
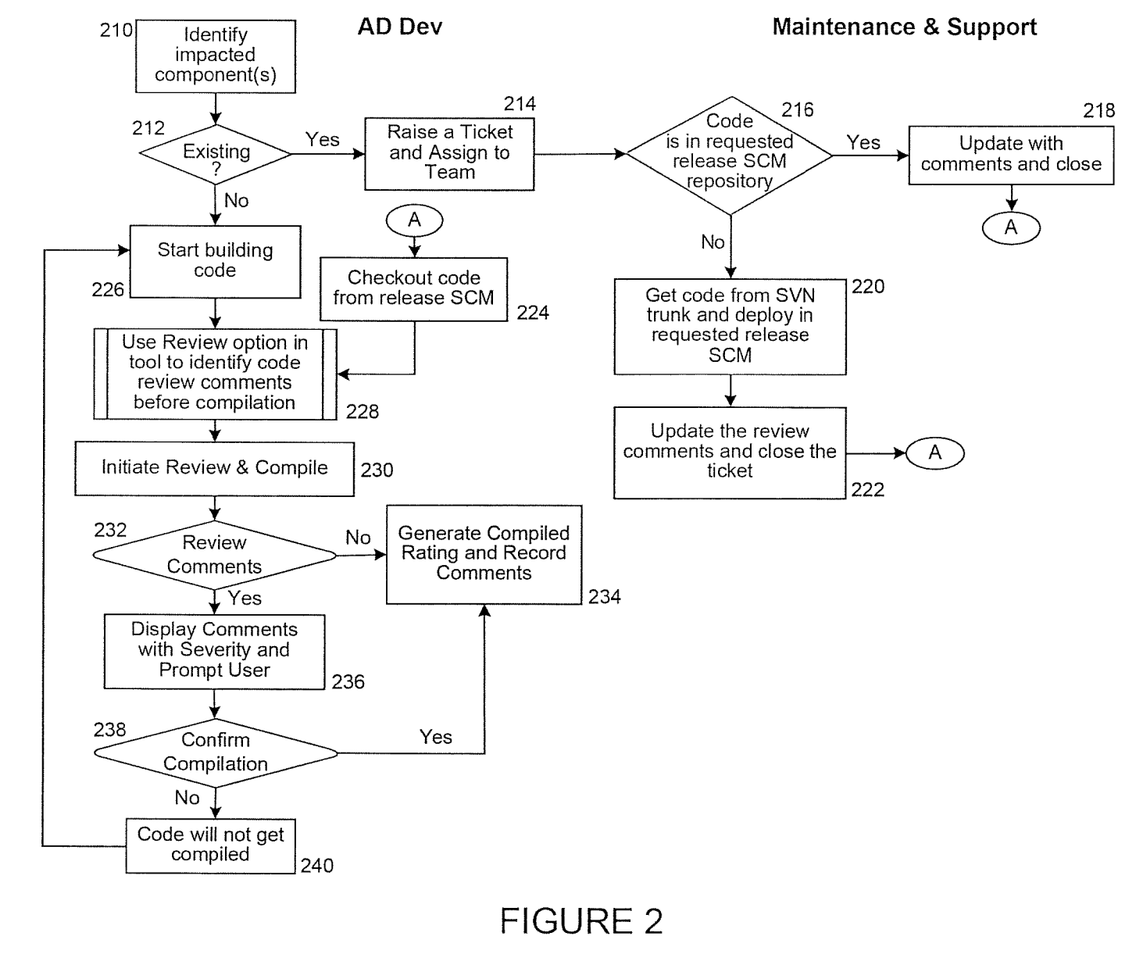
FIG. 2 is an exemplary flowchart of a method for implementing a Code Review Tool, according to an embodiment of the present invention.

FIG. 2 is an exemplary flowchart of a method for implementing a Code Review Tool, according to an embodiment of the present invention. At step 210, the tool may analyze a technical spec document (or other source) and identify code review components. At step 212, the tool may determine if components currently exist. If yes, the tool may raise a ticket, such as a Jira ticket, and assign to a team, such as a maintenance and support team, at step 214. At step 216, the team may determine whether the code is in a requested release source control management (SCM) repository, this may be used for managing code versions. At step 218, the team may update with comments and close the ticket. At step 220, the team may retrieve code from a SVN trunk and deploy in a requested release SCM. More specifically, there may be code branches for every release where the code requested may be checked out and stored based on a development plan aligned to releases, e.g., R216 may be a code branch created for a second release in a particular year or time period. A branch may be created as R216 and developers may check out and check in the code from this branch. At step 222, the team may update review comments and close the ticket. At step 224, code may be checked out from release SCM. At step 226, the Code Review Tool may initiate code building. According to an exemplary embodiment, code building may occur in an integrated development environment, such as Eclipse. Eclipse represents an integrated development environment (IDE) that contains a base workspace and an extensible plug-in system for customizing the environment. Other integrated development environments may be implemented. At step 228, the Code Review Tool may use a review option to identify comments before compilation. The automated code review function of an embodiment of the present invention may verify and check functions including naming convention, general standards, performance considerations, usage of APIs, code ratings, etc. As illustrated in FIG. 2, the innovative tool may initiate a code review process prior to compiling or running the code.

At step 230, on completion, the Code Review Tool may initiate a review and compile function. At step 232, the Code Review Tool may review comments. If there are no comments, a compile rating may be generated and comments may get recorded in a log or other format, at step 234. If comments exist, the comments may be displayed with a severity rating, at step 236. Other indicators and status data may be provided. At step 238, the Code Review Tool may confirm compilation. If compilation is not confirmed, the code will not get compiled at step 240. The tool may then start building code at step 226. If compilation is confirmed, code gets a compiled rating and comments may be recorded, at step 234. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
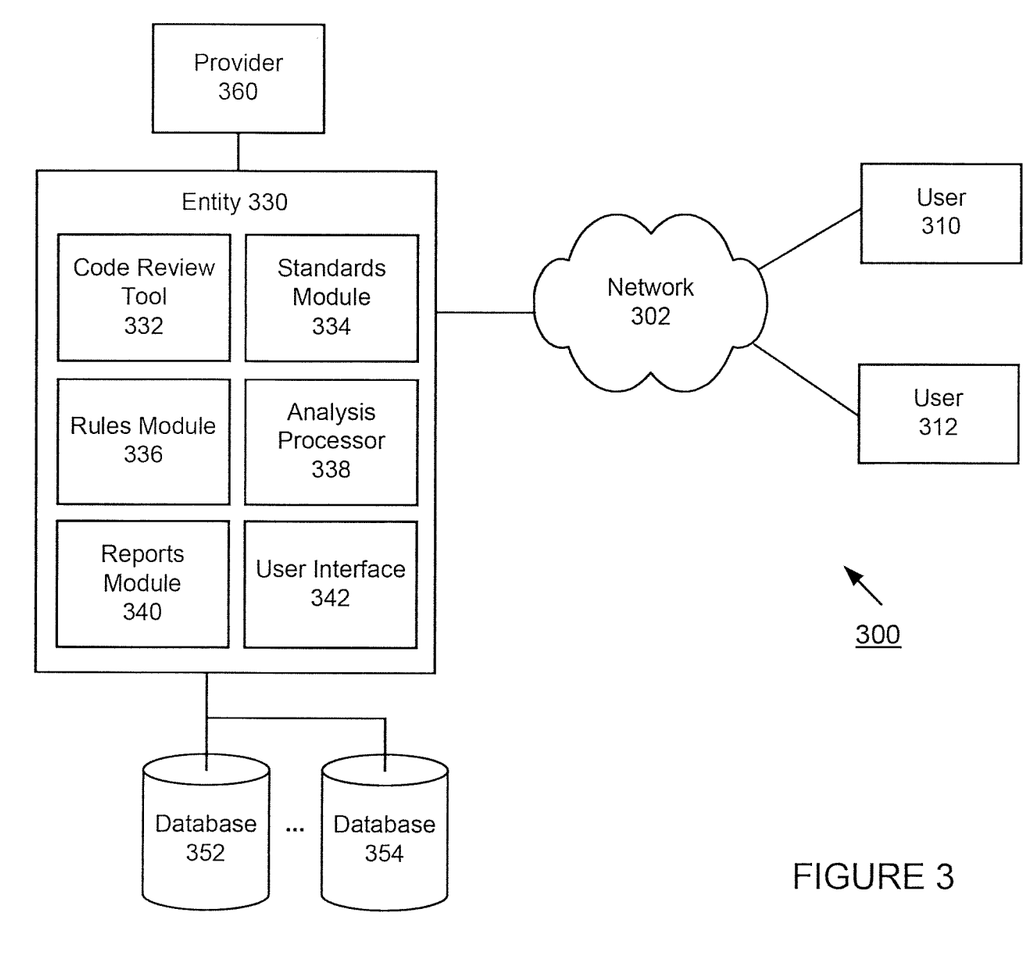
FIG. 3 illustrates a schematic diagram of a system that implements a Code Review Tool, according to an exemplary embodiment.

FIG. 3 illustrates a schematic diagram of a system that implements a Code Review Tool, according to an exemplary embodiment. As illustrated in FIG. 3, Network 302 may be communicatively coupled with one or more data devices including, for example, computing devices associated with Users 310, 312. Such devices may include mobile devices, including mobile phones, smart devices, etc. Network 302 communicates with Entity 330 that performs coding functionality and other support. Entity 330 may include a Code Review Tool 332 that automates and facilitates code review. Code Review Tool 332 may also incorporate modules and other functions, such as Standards Module 334, Rules Module 336, Analysis Processor 338, Reports Module 340, and User Interface 342. These modules are exemplary and illustrative, Code Review Tool may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Code review data may be stored and managed by Database 352, 354. Also, Databases 352, 354 may also store and maintain rules, standards data, reports, performance, code, etc. The code review features described herein may be provided by Entity 330 and/or a third party provider, represented by 360, where Provider 360 may operate with Entity 330.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 is depicted, it should be appreciated that other connections and relationships are possible. The system 300 described below may be used to implement the various methods herein, by way of example. Various elements of the system 300 may be referenced in explaining the exemplary methods described herein.

Network 302 may be a wireless network, a wired network or any combination of wireless network and wired network. For example, Network 302 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 302 may support an Internet network, a wireless communication network, a cellular network, Bluetooth, or the like, or any combination thereof. Network 302 may further include one, or any number of the exemplary types of networks mentioned above operating as a stand-alone network or in cooperation with each other. Network 302 may utilize one or more protocols of one or more network elements to which it is communicatively coupled. Network 302 may translate to or from other protocols to one or more protocols of network devices. Although Network 302 is depicted as one network for simplicity, it should be appreciated that according to one or more embodiments, Network 302 may comprise a plurality of interconnected networks, such as, for example, a service provider network, the Internet, a cellular network, corporate networks, or even home networks, or any of the types of networks mentioned above.

Data may be transmitted and received via Network 302 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 3 illustrates individual devices or components, it should be appreciated that there may be several of such devices to carry out the various exemplary embodiments. Users 310, 312 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 330.

Entity 330 may be communicatively coupled to Database 352, 354. Database 352, 354 may include any suitable data structure to maintain the information and allow access and retrieval of the information. For example, Database 352, 354 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination thereof with respect to Database 352, 354. Database 352,

354 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 352, 354 may have back-up capability built-in. Communications with Database 352. 354 may be over a network, such as Network 302, or communications may involve a direct connection between Database 352, 354 and Entity 330, as depicted in FIG. 3. Database 352, 354 may also represent cloud or other network based storage.

Having described an example of the hardware, software, and data that can be used to run the system, an example of the method and customer experience will now be described.

Figure 4:
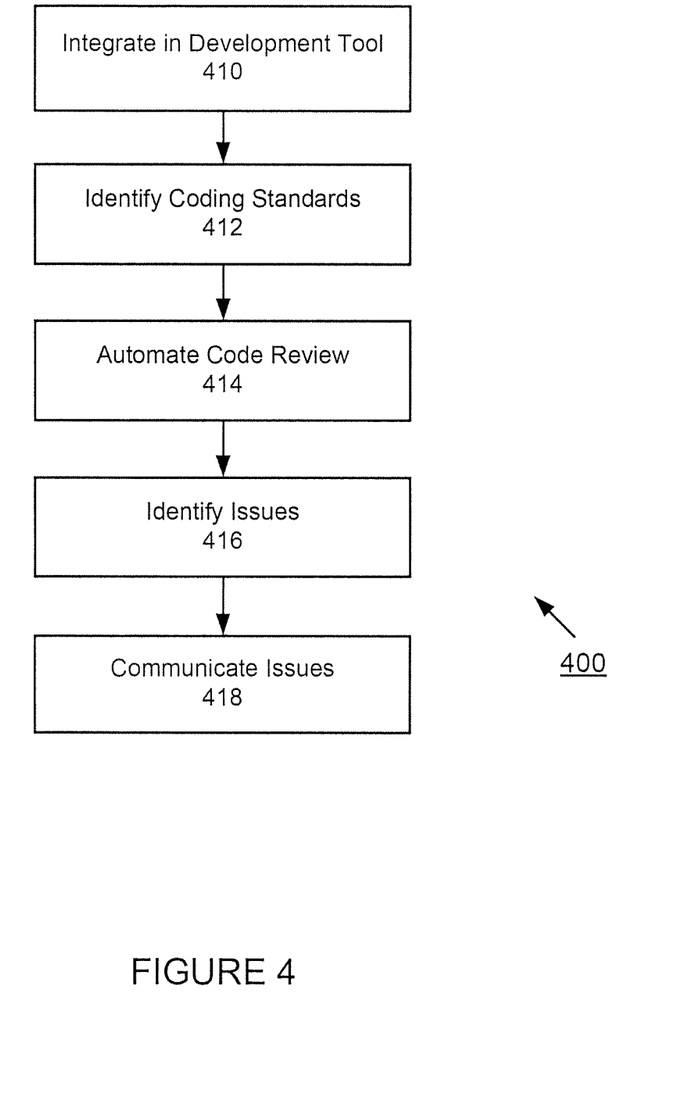
FIG. 4 is an exemplary flowchart for implementing a Code Review Tool, according to an embodiment of the present invention.

FIG. 4 is an exemplary flowchart for implementing a Code Review Tool, according to an embodiment of the present invention. At step 410, a Code Review Tool may be integrated with a development tool. This may involve installing and configuring a Code Review Tool plugin that may be integrated with a development tool. At step 412, coding standards, requirements and/or other specifications may be identified. Also, environment settings may be configured. An automated code review process may be performed at step 414. For example, code review may involve reviewing the code and then compiling the code. At step 416, the code review process may identify issues. At step 418, the Code Review Tool may communicate issues to an end user, via an interactive user interface. For example, a report or other output may be generated and electronically communicated to an authorized recipient, web front and/or platform. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Figure 5:
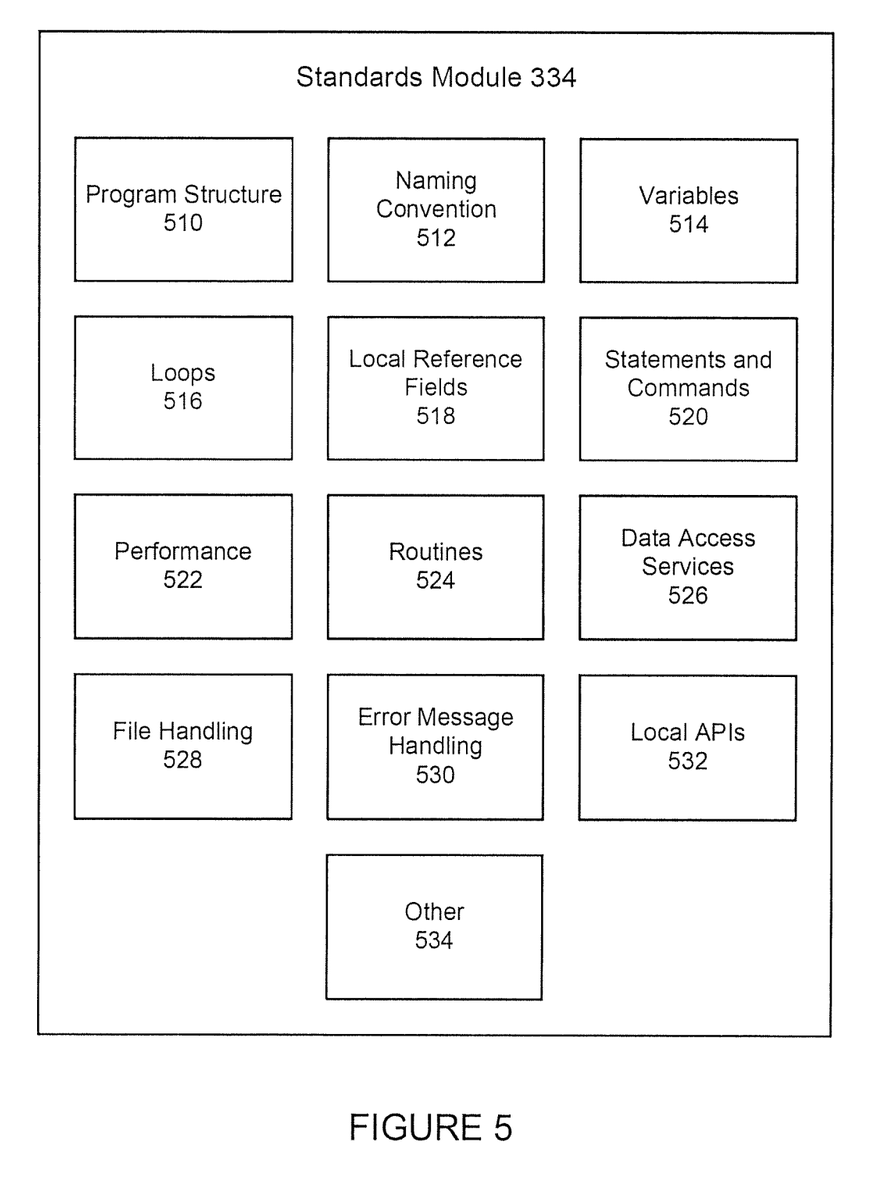
FIG. 5 is an exemplary diagram of a Standards and Requirements Module, according to an embodiment of the present invention.

FIG. 5 is an exemplary diagram of a Standards Module, according to an embodiment of the present invention. Standards Module may identify and maintain various coding and programming standards to be followed while coding and points to be taken regarding the adherence of local code to development standards. Standards Module may maintain rules that are designed to make code legible, maintainable and operational within various graphical user environments. Requirements may include coding standards, such as Program Structure 510, Naming Convention 512, Variables 514, Loops 516, Local Reference Fields 518, Statements and Commands 520, Performance 522, Routines 524, DAS 526, File Handling 528, Error Message Handling 530, Local APIs 532 and Other represented by 534.

Program Structure 510 may identify general standards. For example, routines in T24 are called subroutines and routines must not be written in a specific manner.

Naming Convention 512 may represent a set of guidelines recommended for choosing the sequence of characters to be used for identifiers which denote variables, labels and functions, for example, in source code. Appropriate choices for variable names are seen as the keystone for good style. Poorly-named variables make code harder to read and understand. Naming conventions reduce the effort needed to read and understand source code; identifies the value which the variable holds and provides understanding of the purpose for which the variable is defined. For example, in T24, subroutine names are limited to 35 characters; subroutine names should not include certain characters and routing name and template names should not be prefixed with a product identifier.

Variables 514 represents a way of referring to a memory location. The memory location may hold any type of data depending on the data type of the variable. Depending upon the life of the variable inside the routine, variables may be categorized based on Local variable; Common variable; Array variable and Record variable. According to an exemplary illustration, usage of local variables may be reduced and wherever possible and local variables can be replaced with common variables.

Loops 516 may be used for iterative purposes to execute same set of instructions specified number of times or until a specific condition or result is obtained. There are various types of loops in jBASE namely, For . . . Next; Loop . . . Remove; Case Statements. Though these loops make the execution of instructions faster and easier, there are certain specific constraints that should be considered while coding these loops in the routine.

Local Reference Fields 518 may represent fields that can be added for a particular application. For example, each application may have a large number of fields to store for an entity, e.g., a bank, financial institution, etc. It may not be feasible or practical for a bank to store all possible fields that a bank may require. To overcome this, T24 provides the functionality of "Local Reference fields." These fields may be added for a particular application depending upon the bank's requirement and are fully customizable. To get this local reference field position, a call can be made to GET.LOC.REF which will return the position of the local reference field from the Standard Selection table. An embodiment of the present invention may apply define standards to use GET.LOC.REF and to retrieve the local field position.

Statements and Commands 520 may represent commands that perform a specific task in a program. This may include commands, such as print or open file or delete and so on. In jBASE, a programmer can make use of available commands and statements to make the code simpler and manageable. Statements and Commands 520 may define commands that can or cannot be used and if usable, the way to use them.

Performance 522 may represent performance issues that may arise in T24, which may be as a result of parameters that are shipped with the application in T24. For example, T24 may be actively modified to default parameter settings to be performance oriented. Performance 622 details certain performance issues that can be overcome by possible usage of another parameter with the same or similar functionality.

Routines 524 may represent routines that are generally used for the field definitions of the applications. For example, some routines can also be used elsewhere if it is called correctly. Routines may further include Multithread Routines, Core Routines, Date Routines, Validation Routines, COB Routines, Core Reusable Routines, Utility Routines, and other types of routines.

Data Access Services 526 maintains and manages query names. Query names should be in lower case with the first character of the second word onward in upper case (e.g., dasApplicationQuery) For example, a query on application SEC.TRADE which selects all deals traded today would be structured dasSecTradeAllDealsToday. Data Access Services (DAS) may consolidate queries (e.g., SELECT operations) performed against a table/application. This centralizes query processing for a given table in one place and removes query language from the code. Each query may be expressed in a simple meta-query language (as per ENQUIRY) that defines the fields, operands, data and joins between criteria (AND/OR).

File Handling 528 defines how to handle files and make calls to files using F.READ, F.WRITE and other available commands which are basically defined in the core API. For example, these files may simply replace the use certain base commands or statements and also increase the performance of the routine.

Error Message Handling 530 may define error messages that are produced.

Local APIs 532 may represent a table of APIs that are used wherever applicable.

As illustrated in FIG. 3, Code Review Tool 332 may implement Rules Module 336. Rules Module 336 may include rules that are applied by an automated Code Review Tool. Rules may include various categories, including Looping, Rating, Static, Count, Initialization, Manual, Select, Batch Select, Logical, Keyword, Parameter, Warning, Nesting, Initialization, Call Routine and other categories. Each Rule may have an associated category and severity level, which may include Blocker, Medium and High. Other measure of severity may be identified and applied. For example, a rule may define a size of code or total number of lines. This rule may be categorized as a Count rule with High Severity. Another rule may define which parameters to hard code, e.g., do not hard code the Parameter value in CALL routine. This type of rule may be a Parameter rule with Medium severity.

Figure 6:
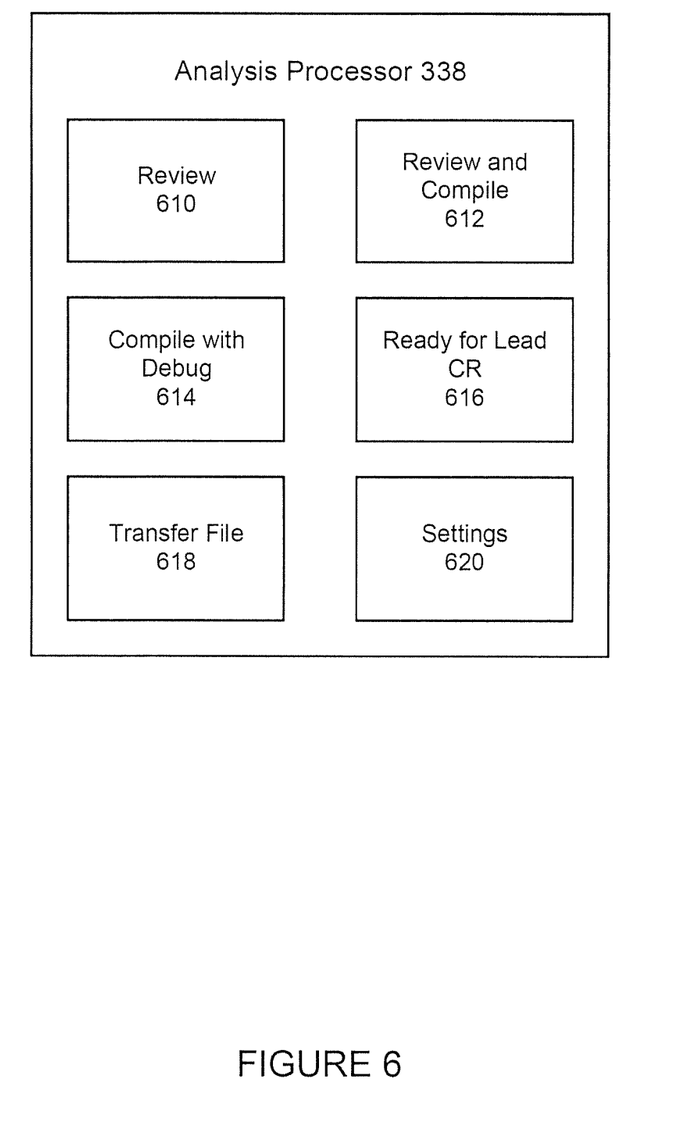
FIG. 6 is an exemplary diagram of an Analysis Processor, according to an embodiment of the present invention.

FIG. 6 is an exemplary diagram of an Analysis Processor, according to an embodiment of the present invention. Analysis Processor may include various features and functions, including Review 610, Review and Compile 612, Compile with Debug 614, Ready for Lead CR 616, Transfer File 618 and Settings 620.

Review 610 may review program and routine and provide the review comments on the code review. The Code Review Tool plugin may validate various coding standards of programming.

Review and Compile 612 may review the Routine and Program and Compile on the Remote Environment and display the compilation result on the Console and Review Comments on the code review.

Compile with Debug 614 may review Routine and Program and compile with debug option on the Remote Environment and display the compilation result on the Console and Review Comments on the Code Review During the Ready for Lead Code Review 616, various actions may be performed including review, compile, get the object to Eclipse, generate the review report and store on a remote server and upload the review report. With this feature, a ticket number may be identified. The system may then generate a report and associate the report with the identified ticket number. An electronic communication (e.g., email, message, text, etc.) may be automatically generated. An authorized recipient maybe notified that a ticket has been raised to check code review plugin Ready for Lead CR functionality. The message may also include attachments, diagrams, graphics, and/or other information and media.

Transfer File 618 may transfer the file to a remote server or other identified recipient. This option may be invoked to transfer dependent files.

Settings 620 may enable a user to update and revise preferences and rules to further expedite code review and analysis.

Figure 7:
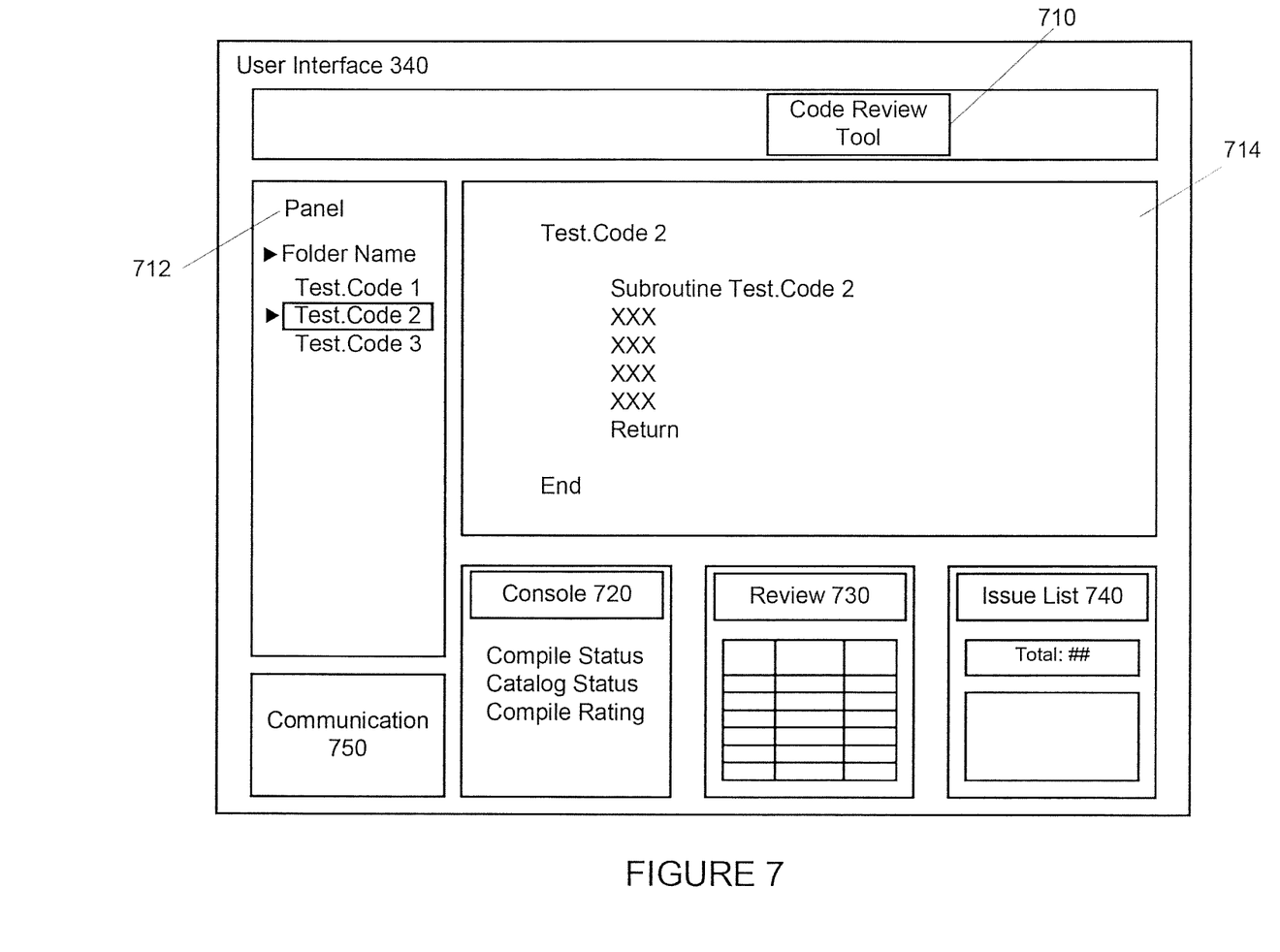
FIG. 7 is an exemplary user interface of a Code Review Tool, according to an embodiment of the present invention.

FIG. 7 is an exemplary user interface of a Code Review Tool, according to an embodiment of the present invention.

As shown in FIG. 7, User Interface may include a Code Review Tool plugin, represented by 710. User Interface may include a Panel 712 that displays folders containing various sets of code. Panel 714 displays a selected code. In this example, Test Code 2 is displayed at 714. Code Review Tool may display various windows, such as Console 720, Review 730 and Issue List 740. Code Review Tool may also provide a communication interface, illustrated by Communication 750. Other displays may be implemented in accordance with the various embodiments of the present invention.

Console 720 may provide compile and catalog status as well as a compile rating. The compile rating may be based on coding standards. The rating may also capture compilation error and warning messages.

Review comments, severity and category may be displayed at Review 730. For example, Review 730 may display in various forms, including chart, table, graph, etc. Review 730 may include review number, severity, type, description, file name, and line number. Severity type may include Warning, Medium, High, etc. Type may include manual, keyword, etc. Description may include a summary of the potential issue.

Issue List 740 may identify potential issues and additional details, including steps and/or recommendations for addressing the issues. Links to additional and source data may be provided as well.

Communication 750 represents an interface that automatically generates communication to authorized recipients of code review status and other details. The communication may include various electronic methods including email, text, chat, voicemail, etc. Communication 750 may also automatically establish a secure connection to address errors, answer questions, provide additional input, provide supervision, etc. In addition, links and/or other resources may also be provided and/or communicated.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control.

The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system that implements an automated core banking system code review tool that is integrated in a development tool, the system comprises:
   a memory component;
   an interactive interface that receives one or more user inputs, the one or more user inputs relating to standards, criteria, and requirements from different developers;
   a static code analyzer for standardizing the one or more user inputs relating to standards, criteria and requirements into common severity criteria;

a processor, coupled to the memory component and the interactive interface, the processor configured to perform the steps comprising:

analyze a technical specification document based on the standardized severity criteria;

identify a plurality of components of an application based on the analyzed technical specification document;

for each component, determine if the respective component currently exist, wherein if the respective component currently exist, verify the components are in a requested release source control management repository and retrieve the component of the application, otherwise, request the user provide a location of the respective component of the application;

initiate automated code review function for the components wherein the code review function applies Info Basic programming standards for jBASE coding, wherein the automated code review comprises the steps of:

review the plurality of components, wherein the review checks and verifies a plurality of functions comprising one or more of naming conventions, general standards, performance consideration, and usage of application program interfaces;

automatically identify existing code review comments from the developers for the reviewed plurality of components;

based on the code review comments from the developers not identifying an issue, automatically compile the component code for the plurality of components and determine any associated compilation error and warning message; and automatically generate a compile rating for the compile code and create a review comment and an issue severity rating for each identified issue; and generate a report containing the identified issues having related review comments and issue severity ratings with no compilation error and warning message if the code review comments identify an issue or a report containing the related review comments, compile rating, and associated compilation errors and warning messages if the code review comments does not identify an issue; and display, via the interactive interface, the generated report.

2. The system of claim 1, wherein the interactive interface displays a compile status, catalog status and compile rating for the code review.

3. The system of claim 1, wherein the interactive interface displays a review panel with review number, severity, type, description, file name and line number for the code review.

4. The system of claim 1, wherein the interactive interface displays an issue list for the code review.

5. The system of claim 1, wherein an electronic communication is automatically generated and transmitted to one or more identified recipients in response to the code review.

6. The system of claim 5, wherein the electronic communication is an email communication.

7. The system of claim 1, wherein the code review function applies Info Basic programming standards for Temenos Application Framework for C (TAFC) coding.

8. The system of claim 1, wherein the application specific to a financial institution.

9. The system of claim 1, wherein the processor is configured to perform:

applying one or more rules where each rule has an associated category and severity level.

10. An automated computer implemented method that implements an automated core banking system code review tool that is integrated in a development tool comprises the steps of:

receiving, via an interactive interface, one or more user inputs, the one or more user inputs relating to standards, criteria, and requirements from different developers;

standardizing, via a static code analyzer, the one or more user inputs relating to standards, criteria and requirements into common severity criteria;

analyzing a technical specification document based on the standardized severity criteria;

identifying a plurality of components of an application based on the analyzed technical specification document;

for each component, determining if the respective component currently exist, wherein if the respective component currently exist, verifying the components are in a requested release source control management repository and retrieving, from a memory, the component of the application, otherwise, request the user provide a location of the respective component of the application;

initiating, via a computer processor, automated code review function for the components wherein the code review function applies Info Basic programming standards for jBASE coding, wherein the automated code review comprises the steps of:

reviewing the plurality of components, wherein the review checks and verifies a plurality of functions comprising one or more of naming conventions, general standards, performance consideration, and usage of application program interfaces;

automatically identifying existing code review comments from the developers for the reviewed plurality of components;

based on the code review comments from the developers not identifying an issue, automatically compile the component code for the plurality of components and determine any associated compilation error and warning message; and automatically generating a compile rating for the compile code and create a review comment and an issue severity rating for each identified issue; and generating a report containing the identified issues having related review comments and issue severity ratings with no compilation error and warning message if the code review comments identify an issue or a report containing the related review comments, compile rating, and associated compilation errors and warning messages if the code review comments does not identify an issue; and displaying, via the interactive interface, the generated report.

11. The method of claim 10, wherein the interactive interface displays a compile status, catalog status and compile rating for the code review.

12. The method of claim 10, wherein the interactive interface displays a review panel with review number, severity, type, description, file name and line number for the code review.

13. The method of claim 10, wherein the interactive interface displays an issue list for the code review.

14. The method of claim 10, wherein an electronic communication is automatically generated and transmitted to one or more identified recipients in response to the code review.

15. The method of claim 14, wherein the electronic communication is an email communication.

16. The method of claim 10, wherein the code review function applies Info Basic programming standards for Temenos Application Framework for C (TAFC) coding.

17. The method of claim 10, wherein the application specific to a financial institution.

18. The method of claim 10, further comprising the step of:

applying one or more rules where each rule has an associated category and severity level.

\* \* \* \* \*